United States Patent [19]

Chen et al.

[11] 3,928,447

[45] Dec. 23, 1975

[54] SEPARATION AND PURIFICATION OF DIALKYLDIMETHYL AMMONIUM HALIDES

[75] Inventors: Ting P. Chen, Wappingers Falls; Ronald E. Jones, Glenham, both of N.Y.

[73] Assignee: Texaco Inc., New York, N.Y.

[22] Filed: Mar. 22, 1974

[21] Appl. No.: 453,918

[52] U.S. Cl. .................... 260/567.6 M; 260/567.6
[51] Int. Cl.² .......................................... C07C 85/26
[58] Field of Search .............. 260/567.6 R, 567.6 M

[56] References Cited
UNITED STATES PATENTS 3,813,441  5/1974  Muller-Schiedmeyer et al. 260/567.6

OTHER PUBLICATIONS
Ralston et al., J. Org. Chem., Vol. 13, pp. 186–190, (1948).

*Primary Examiner*—James O. Thomas, Jr.
*Assistant Examiner*—James H. Reamer
*Attorney, Agent, or Firm*—T. H. Whaley; C. G. Ries; Bernard Marlowe

[57] ABSTRACT

This invention concerns a process for separating and purifying disecondaryalkyl dimethylammonium halides, a quaternary ammonium halide, from contaminants of the amine hydrohalide type through the treatment of a clarified, water-free, lower molecular weight alkanol medium with gaseous ammonia.

7 Claims, No Drawings

SEPARATION AND PURIFICATION OF DIALKYLDIMETHYL AMMONIUM HALIDES

BACKGROUND OF THE INVENTION

This invention relates to the preparation of highly purified dialkyldimethylammonium halides free from contaminating amine hydrohalide.

More particularly, this invention concerns the separation of said halides from non-aqueous reaction mixtures containing specific dialkyldimethylammonium halides or mixtures of said dialkyldimethylammonium halides, contaminated with amine hydrohalide-types of impurities.

The preparation of ammonium halides particularly the chlorides is well documented in the technical and patent literature.

Most of the preparative methods described in the literature are by quaternization of a tertiary amine with alkyl halides. However, a few of the published procedures report the direct methylation of a secondary amine to the quaternary ammonium compound as shown by the following equation which illustrates the preparation of the "chloride" compound:

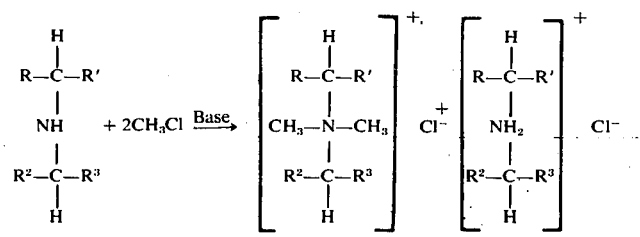

wherein, R, R', $R^2$ and $R^3$ are alkyl radicals or hydrogen which can be the same or different at any given time.

The reaction proceeds well when the R and $R^2$ are primarily straight chain alkyl groups and R' and $R^3$ are hydrogen since steric hindrance is apparently not a problem. This is borne out by page 138 of the text "Fatty Acids And Their Industrial Applications" published by Marcel Dekker, Inc., N.Y., in 1968 and edited by Pattison. Yields are exceptionally good and very little (5%) of amine hydrochloride is to be found in the product and for most applications, no further purification is required.

Unfortunately, the applicants have discovered that when the alkyl groups R, R', $R^2$ and $R^3$ contain about 2 to 24 carbon atoms, the secondary amines are most recalcitrant to methylation, probably due to steric hindrance and the more severe reaction conditions that must be employed. For example, a large excess (over 250% of methyl halide over what is required by stoichiometry) must be used. As a consequence of this, a great deal (35 mole % and higher) of non-quaternary, amine hydrohalide-type impurities are formed. Not only are yields poor, in the order of about 40 mole %, but at this yield level a highly efficient separation of said contaminating amine hydrohalide-type impurities from the quaternary ammonium product becomes a necessity.

Recently, the applicants have found that dialkyl (wherein the alkyl group contains from at least 10 carbon atoms and up) dimethylammonium halides (preferably the chloride salts) contaminated with amine hydrohalide (especially hydrochloride) salts can be separated and purified by the process set forth infra.

SUMMARY OF THE INVENTION

In the broadest contemplated process, mixtures of dialkyldimethylammonium halides) containing amine hydrohalide-type impurities are:

a. contacted with at least a solubilizing amount of substantially water-free, inert lower alkanol solvent in which both dialkyldimethylammonium (quaternary ammonium) halide and said amine hydrohalides are substantially soluble, to form a one phase system containing both quaternary ammonium halide and amine hydrohalide components, b. then contacting said one phase system containing said quaternary and hydrohalide components with excess gaseous ammonia over what is required by stoichiometry to react with said amine hydrohalide-type impurities until all of the hydrohalide forms insoluble ammonium halides, leaving behind the soluble quaternary halide component in solution, plus the free amines liberated by the ammonia, c. separating the soluble quaternary ammonium halide and free amine from said insoluble ammonium halide and, d. evaporating the solution containing quaternary ammonium halide and free amine to a dry residue, e. treating said residue with water to form a water-soluble phase in which the quaternary ammonium halide compounds are soluble and an oily phase containing the free amines separated-out in the top layer, and f. separating the solubilized quaternary ammonium chloride contained therein from said phase of free amine.

In a more specific process embodiment a residue containing di-($C_{10}$–$C_{24}$)-secondaryalkyldimethylammonium chloride (quaternary ammonium halide) and amine hydrochloride prepared by the base catalyzed methylation of di($C_{10}$–$C_{24}$)-secondaryalkyl amines with a stoichiometric excess (200–300 mole % excess) of methyl chloride, and stripped to a residue containing at least 30 mole % of the desired di-($C_{10}$–$C_{24}$)-secondaryalkyldimethylammonium chloride is:

a. solubilized with 4–8 moles of a lower alkanol solvent per mole of said quaternary ammonium chloride-containing residue to produce a one-phase solution of di-($C_{10}$–$C_{24}$)-secondaryalkyldimethylammonium chloride and amine hydrochloride-type, b. then treating said one-phase solution with an excess of ammonia over what is required by stoichiometry to convert the hydrochloride-type impurities into insoluble ammonium chloride until all of said lower alkanol-soluble di-($C_{10}$–$C_{24}$)-secondaryalkylaminehydrochlorides are converted to their corresponding free amines, and ammonium chloride which is insoluble leaving a solution containing di-($C_{10}$–$C_{24}$)-secondaryalkyldimethylammonium chloride and free amines, c. removing the ammonium chloride precipitate from the lower alkanol solution consisting essentially of said alkanol soluble di-($C_{10}$–$C_{24}$)-secondaryalkyldimethylammonium chlorides and free di-($C_{10}$–$C_{24}$)-secondaryalkylamines derived from hydrochloride-type impurities, d. evaporating the lower alkanol solution consisting essentially of the di-($C_{10}$–$C_{24}$)-secondaryalkyldimethylammonium chloride and residuum amines derived from said amine hydrochloride-type impurities to a dry residue, e. treating said residues with sufficient water to dissolve the di-($C_{10}$–$C_{24}$)-secondaryalkyldimethylammonium chlorides whereas the said free amines derived from said impurities are insoluble, and f. separating the di-($C_{10}$–$C_{24}$)-secondaryalkyldimethylammonium chlorides contained in said water phase.

In the most specific process embodiment contemplated a solid composition comprising from 0.3 to 0.5 moles of a di-($C_{10}$–$C_{24}$)-secondaryalkyldimethylammonium chloride product and from 0.7 to 0.5 moles of amine hydrochloridetype contaminants, said solid composition being derived from a clarified and dehydrated reaction mixture resulting from the methylation of a mixture of di-($C_{10}$–$C_{24}$)-secondary-alkyl amines with a stoichiometric excess (about 250 mole % excess) of methyl chloride, in the presence of from 1.0 to 1.2 moles of inorganic base (i.e., sodium hydroxide) at temperatures between 100° and 155°C and at autogenous pressure is:

a. contacted with from 6 to 7 moles of a substantially anhydrous isopropanol to solubilize said solid containing product and contaminant and produces a one phase solution consisting essentially of said dialkyldimethylammonium chloride and amine hydrochloride-type contaminants, b. treating said one phase solution with from 0.5 to 0.7 moles of gaseous ammonia per mole of amine hydrochloride contaminants present in said isopropanol solution until all of the soluble amine hydrochloride-type contaminants are converted to insoluble ammonium chloride and free amines which are soluble in isopropanol, c. separating the insoluble contaminants from soluble product, and d. isolating the soluble dialkyldimethyl ammonium chloride contained therein by further treating with water.

In order to more clearly set forth in more detail the scope of this invention, the following supplementary disclosure is submitted.

A. PREPARATION OF
DI-($C_{10}$–$C_{24}$)-SECONDARYALKYL AMINE AND
DI-($C_{10}$–$C_{24}$)-SECONDARYALKYLMETHYL
AMINE SUBSTRATES

These secondaryalkyl amine* substrates when methylated provide the reaction mixture of quaternary ammonium halides (or di-secondaryalkyldimethylammonium halides) which require treatment by the inventive process. These amines are prepared by well known procedures disclosed in the following examples or as well as by both the technical and/or the patent literature. Alternatively many of these materials can be obtained from commercial sources. For the sake of illustration the following procedures can be employed.

*Highly branched secondaryalkyl amine as used throughout the disclosure refers to those paraffinic amines where the amine group is bonded to a secondary carbon of two linear paraffin molecules.

1. Specific di-($C_{10}$–$C_{24}$)-secondaryalkylmethyl amines having alkyl groups containing 10 to 24 carbon atoms can be prepared in high yield by modifications of the process of W. Eschweiler [Ber, 28,880 (1905)] and/or H. T. Clark et al. (UACS,55,457(1933)) processes wherein secondary amines are methylated with formic acid or formaldehyde.

2. Specific di-secondaryalkyl amines (wherein the alkyl groups contain 10 to 24 carbon atoms) can be prepared by condensing two moles of secondaryalkyl primary amines at temperatures of about 200°C in the presence of a nickel catalyst (Harshaw 01)4T under hydrogen pressure).

B. DIALKYLDIMETHYLAMMONIUM HALIDES

These are alternatively known and more often referred to as quaternary ammonium halides. The generic formula for the favored chloride salts is shown above. As is well known these "quaternary" compounds have four carbon atoms linked directly to the nitrogen atom through covalent bonds. The halide anion (preferably chloride) in the original methylating agent (preferably methyl chloride) is linked to the nitrogen through an ionic bond.

As indicated previously the favored quaternary ammonium halides which are most useful in the instant process are those which contain in addition to the two methyl groups, two secondary alkyl groups, containing 10 to 24 carbon atoms in secondary carbon atoms to nitrogen (in contrast to primary carbon atom to nitrogen) bonded linkages. This particular type of quaternary ammonium salts is favored inasmuch as while they generally possess good biological and/or surfactant activity they contain large quantities of non-quaternary contaminants which are difficult to remove using conventional treatment processes. While generally speaking the corresponding bromide and/or the iodide salts are also conducive to the use of the inventive separation and purification process, the higher cost of methyl bromide and methyl iodide ordinarily precludes their routine use as methylating agents.

The quaternary ammonium halides which can be employed as substrates in the subject process contain among many others the following di-secondaryalkyl groups in addition to the dimethyl substituents: $C_{10}H_{21}$, $C_{11}H_{23}$, $C_{12}H_{25}$, $C_{13}H_{27}$, $C_{14}H_{29}$, $C_{15}H_{31}$, $C_{16}H_{33}$, $C_{17}H_{35}$, $C_{18}H_{37}$, $C_{19}H_{39}$, $C_{20}H_{41}$, $C_{21}H_{43}$, $C_{22}H_{45}$, $C_{23}H_{47}$, $C_{29}H_{59}$, among others. The di-secondaryalkyl groups can be the same or different as long as the minimal number of carbon atoms in each alkyl group is 10 or more. The quaternary ammonium halides can be in the form of discrete single compounds or in the form of mixtures. That is, di-($C_{10}$–$C_{24}$)-secondary-alkyldimethylammonium halides having alkyl groups containing mixtures of from 10 to 24 carbon atoms. The di-($C_{10}$–$C_{24}$)-secondaryalkyldimethylammonium halides preferred are primarily mixtures since they lend themselves to separation and purification by the inventive process and partially because the unmethylated precursor mixtures are currently available at low cost in large quantities in a reasonable state of purity.

C. SOURCE OF CONTAMINATED QUATERNARY HALIDES

Generally speaking while the quaternary ammonium halides which are treated in the inventive process can be derived from other precursors (for example quaternization of a tertiary amine with an alkyl halide) the much higher yields and relatively small quantities of amine-hydrohalide type impurites do not require use of the inventive process. Consequently, for practical purposes, two types of reactions employing disecondaryalkyl amines as the starting materials are the source of the quaternary ammonium halide salts to be treated. Either of two variations may be used. They are:

1. The direct one-step methylation of a disecondary alkyl amine in the presence of base and excess methyl halide;
2. the two-step procedure of first preparing the intermediate di-secondaryalkylmethyl amine, followed by subsequent quaternization with methyl halide.

Inasmuch as the yields and proportions of amine hydrohalide-type contaminants are about the same, the single step process (1) is preferred.

D. INERT SOLVENTS

The solvents used to solubilize the mixture of quaternary ammonium halide product and amine hydrohalide contaminant have two requirements in addition to inertness. They are:

1. they must permit the preparation of a 3–8 mole % solution of the quaternary ammonium halide to be purified as well as a 8–18 mole % solution of the amine hydrohalide contaminant.
2. they must, subsequent to their solubilization, retain the product in solution and while offering an insoluble medium for the contaminating amine hydrohalide impurities after the treatment with gaseous ammonia.

Illustrative Inert Solvents which may be employed during treatment of ammonia include the lower alkanols such as methanol, ethanol, propanol, isopropanol, butanol and isobutanols. These solvents should be substantially anhydrous, that is, contain less than 5% of water. However, certain substantially water-free (anhydrous) aprotic solvents can be used in conjunction with the favored alkanols. Favored aprotics include N,N-dimethyl formamide and dimethyl sulfoxide.

The preferred inert solvent for the solid reaction product is substantially anhydrous isopropanol. Isopropanol is preferred since it consistently produces contaminant-free quaternary ammonium products in good yield.

E. GASEOUS AMMONIA TO SPRING NON-QUATERNARY AMMONIUM CONTAMINANTS

While other bases such as sodium hydroxide are well known to spring amines from their halide salts, for reasons presently unclear, gaseous ammonia, particularly when used in conjunction with substantially anhydrous isopropanol, produces the desired quaternary ammonium halide produce with substantially less contaminating amine hydrohalide-type by-products. It should be noted that while the efficacy or success of the inventive process is not postulated upon the assignment of a particular structure to these non-quaternary ammonium halides (amine hydrohalide-type) contaminants, analytical data appears to indicate that the "non-quaternary amine hydrohalide type impurities" are primarily the secondary amine used as starting material.

F. PREFERRED PROCESS AND REACTION CONDITIONS FOR PREPARING QUATERNARY AMMONIUM CHLORIDE AND THEIR PURIFICATION.

A charge comprising 0.5 mole (175–180 g) portion of di($C_{10}$–$C_{14}$)-secondaryalkyl amine 10 to 20% excess (20–25 g) of sodium or potassium hydroxide, 175–225 g isopropanol (4 to 35 parts by weight), water (1.0 to 1.5 parts by weight), 3 to 4 moles (150 to 200 g) of methyl chloride is added to a reactor capable of being pressurized, heated and agitated. The reactor is sealed and heated to 80° to 120°C with agitation, at pressures ranging from autogenous to 500 psig until the pressure becomes constant. At the end of this time (about 4 to 7 hours) the reactor is cooled, vented off and the reaction mixture filtered to remove insoluble matter such as inorganic salts and the water and volatiles are stripped off.

This water-free residue is treated with a solubilizing amount of anhydrous isopropanol (3–4 moles). The solution is then treated with an excess ammonia at 27° to 40°C to convert the reaction by-product amine-hydrochloride to free amine and insoluble ammonium chloride which is removed from the isopropanol solution. The desired product of di-($C_{10}$–$C_{14}$)-secondaryalkyldimethylammonium chloride can be obtained by evaporating off the isopropanol down to a residue under vacuum, taking it up in water to form two phases comprising a water phase containing the di-($C_{10}$–$C_{14}$) secondaryalkyldimethylammonium chloride and an organic phase, containing the generated free amine. The water phase containing said quaternary ammonium chloride is stripped in vacuum at 40° to 50°C and dried over $P_{2O5}$ under vacuum.

N.M.R. infrared, gas chromatography and elemental analysis are used to confirm that the desired product is formed and the extent of contamination.

In order to show the detailed operating of the inventive process, the following illustrative embodiments and examples are submitted. Unless otherwise stated, all temperatures are expressed in degrees centigrade and all parts are expressed by weight rather than by volume.

EMBODIMENT A

Preparation of a Reaction Mixture containing Di-($C_{10}$–$C_{14}$)-secondary alkyldimethylammonium Chloride Product and Amine Hydrochloride-type Contaminants In this embodiment the reaction mixture is derived from the methylation of a mixture of di-($C_{10}$–$C_{14}$)-secondary alkylamine in the presence of base, using methyl chloride (in excess) as methylating agent. The reaction is conducted in a pressurized reactor at autogenous pressure.

To a pressurized reactor capable of being heated and agitated is charged 0.5 moles of di-($C_{10}$–$C_{14}$)-secondary alkylamine, 20–25 grams of sodium hydroxide dissolved in 200 g. of isopropanol) and 3.5 moles of methyl chloride (a 250% excess of methyl chloride over what is required by stoichiometry) methylating agent. The reactor is sealed and heated to 100°–110°C with agitation for 5½ hours at autogenous pressure until the pressure becomes constant. At the end of this time the reactor is allowed to cool to room temperature and the volatiles, primarily methyl chloride, are vented off.

The reaction mixture is filtered and the water present is stripped off leaving a residue of di-($C_{10}$–$C_{14}$)-secondary alkyldimethylammonium chloride product contaminated with about 30 to 35% by weight of amine hydrochloridetype impurity based on IR and NMR spectra.

In a related embodiment the same reaction is run using identical reactants and procedures except that the 200 g. of water-isopropanol is replaced with 200 g. of isopropanol.

EMBODIMENT B

Preparation of Another Reaction Mixture containing a different Di-($C_{10}$–$C_{14}$)-secondary alkyldimethylammonium Chloride Product Contaminated with Amine Hydrochloride-type Impurity In this embodiment the procedure of Embodiment A is repeated exactly except that a different mixture of di-($C_{14}$–$C_{15}$)-secondary alkylamine is the substrate that is methylated with methyl chloride. Again the isopropanol water mixture of Embodiment A is employed as the solvent medium for the pressurized methylation. The work-up and analysis are as in Embodiment A.

EMBODIMENT C

Preparation of Yet Another Reaction Mixture Containing a Different Di-($C_{10}$–$C_{20}$) secondaryalkyldimethylammonium Chloride Contaminated with Amine Hydrochloride-type Impurity.

In this embodiment the procedure of Embodiment A is repeated exactly except that the substrate which is methylated is a mixture of di-($C_{16}$–$C_{20}$)-secondary alkylamines. Again the same molar ratios of methyl chloride to secondary amine are maintained and work-up procedures and analysis are as described previously in Embodiment A.

EMBODIMENT D

Preparation of Another Reaction Mixture containing a Di-($C_{12}$)-secondaryalkyldimethylammonium Chloride in which the Alkyl Group is a Specific Group Rather than a Mixture In this embodiment a mixture of secondary dodecane amines is substituted for the secondary amine mixture of Embodiment A on a mole for mole basis. All of the other reactants, solvents, temperatures, pressures, preparative procedures and work-up are as described in Embodiment A.

EMBODIMENT E

Preparation of a Reaction Mixture Containing a Di-($C_{12}$)-primaryalkyldimethylammonium Chloride and Amine Hydrochloride-type Contaminants or other Reaction Mixtures where the Chain Length of the Primary Amine varies from 12–18 Catons a. In this embodiment the reaction mixture is derived from an alkyl primary amine containing $C_{12}$ to $C_{18}$ carbon atoms comparable to those described in "Fatty Acids and their Application," edited by Pattison, 1968, page 138, published by Marcel Dekker Inc., which is believed to be the closest art.

The experimental procedure of Embodiment A is followed exactly in all respects and the same proportions of reactants and solvents are as described. N.M.R. infrared and G.C. analysis indicated a 95% yield with little contamination (5% of amine-type hydrochloride-type contaminants); however, there is no mention of amine hydrochloride byproduct in the prior art.

b. However, in a closely related run the above procedure is followed exactly except that a branched disecondary alkyl amine where the secondary alkyl groupings containing mixtures of $C_{10}$ to $C_{20}$ carbon atoms are methylated as described in (a) and clarified and dehyrated as described in Embodiments A to D. Both N.M.R. and I.R. indicate that a 40–60% yield of quaternary salt is obtained contaminated with 35 to 40% of amine hydrochloride-type contaminants.

EXAMPLE 1

Separation and Purification of a Di-($C_{10}$–$C_{14}$)-secondaryalkyldimethylammonium chloride from Aminehydrochloride-type Contaminants The clarified dehydrated residue of the reaction mixture of Embodiment A containing the desired di-($C_{10}$–$C_{14}$)-secondaryalkyldimethylammonium chloride as well as about 30 to 35% its weight of amine hydrochloride-type impurities is re-dissolved in the least amount of anhydrous isopropanol and gaseous ammonia and is passed into the isopropanol solution at room temperature. The precipitate of the ammonium chloride is filtered off and the alkanol stripped off under vacuum. The remaining residue is mixed with enough water producing a two phase system consisting of an aqueous and organic phase. The organic phase is separated while the aqueous phase containing quaternary ammonium chloride product is stripped under vacuum at 40°C to give a viscous liquid which is dried to a solid product. A yield of about 40 mole % of quaternary ammonium chloride having less than 5% of amine-type contaminant is obtained. Both I.R. and N.M.R. and elemental analysis confirm that the desired product is formed.

EXAMPLE 2

Separation and Purification of Di-($C_{14}$–$C_{15}$)-secondaryalkyldimethylammonium chloride The filtered and dehydrated residue of Embodiment B containing di-($C_{14}$–$C_{15}$)-secondaryalkyldimethylammonium chloride and 35 to 40% its weight as amine hydrochloride-type impurities, is re-dissolved in the least amount of anhydrous isopropyl alcohol and an excess gaseous ammonia is added at 30°C to the isopropanol solution containing the reaction mixture of quaternary ammonium chloride and amine hydrochloride-type contaminant. A white precipitate of ammonium chloride separates. After centrifuging the precipitate off, the isopropanol is stripped off under vacuum and the residue is mixed with enough water to form a water phase (which contains largely product) and an organic phase (or predominantly amine-type impurites). After separating the organic phase, the aqueous phase is reduced to a viscous liquid which by the analysis described in Example 1 confirms it to be the desired di-($C_{14}$–$C_{15}$)-secondaryalkyldimethylammonium chloride.

EXAMPLE 3

Separation and Purification of a Di-($C_{16}$–$C_{20}$) secondaryalkyldimethylammonium Chloride The filtered and dehydrated residue obtained in Embodiment C containing the desired quaternary chloride and 30–35% of amine hydrochloride-type contaminants based on the residue weight is dissolved in the least amount of anhydrous isopropanol and an excess gaseous ammonia is passed into the isopropanol containing both product and impurities, causing a precipitate of ammonium chloride to form. The precipitate is filtered off and the isopropanol is stripped off under vacuum leaving a viscous residue. The residue is mixed with enough water and is shaken to form two phases, an organic phase and an aqueous phase. The aqueous phase containing product is evaporated under vacuum to dryness and analyzed. IR and NMR analysis again confirms that the desired product is formed.

EXAMPLE 4

Separation and Purification of a Di-($C_{12}$)-secondaryalkyldimethylammonium chloride from Amine Hydrochloride-type Contaminants.

In this example, the clarified and dehydrated residue of Embodiment D containing 30 to 35% of amine-type impurities (based on residue weight) is dissolved in the least amount of anhydrous isopropanol and an excess ammonia is passed in at room temperature, causing precipitation of ammonium chloride. The precipitated material is filtered off and the isopropanol stripped off under vacuum leaving a viscous liquid. The liquid is mixed with enough water producing a two-phase system. The organic phase is separated and the aqueous phase is reduced to a solid under vacuum and analyzed. Infrared and NMP analysis confirm that the expected quaternary ammonium chloride product is obtained.

EXAMPLE 5

Separation and Purification of Di-(primaryalkyl)dimethylammonium Chlorides of the Prior Art from Aminehydrochloride-type Contaminants compared to Di-($C_{10}$–$C_{24}$)-secondaryalkyldimethylammonium Chlorides employed by Inventors In this example, the reaction mixture referred to in Embodiment "E-2" after filtering and dehydrating water is split into two portions (a) and (b). Both the (a) and (b) portions are taken up into isopropanol but in (a) gaseous ammonia is passed into the isopropanol filtrate as in Examples 1 to 4 whereas in (b) the anhydrous isopropanol filtrate is treated with powdered sodium hydroxide. The use of sodium hydroxide to liberate amine from the isopropanol solution containing a reaction mixture of amine hydrochloride and quaternary ammonium chloride was incomplete because of sodium hydroxide not being very soluble in isopropanol. We have also found that if an aqueous sodium hydroxide is used, the conversion of amine hydrochloride is incomplete. A product contaminated with amine hydrochloride is obtained. In contrast after work-up, portion (a) yields a pure product, as do Examples 1 to 4.

As the several embodiments and illustrative examples indicate, the subject process is both useful and has unexpected results. For example, it was completely unforeseen that base catalyzed methylation reaction mixtures of the prior art as typified by Pattison's Quaternary Ammonium Chloride salts containing di-normal alkyl groups (described in "Fatty Acids and their Industrial Applications") can be separated and purified without solubilization with lower alkanol followed by treatment with gaseous ammonia, whereas applicants' seemingly comparable methylation reaction mixture necessitates this treatment. Inasmuch as the only difference of substance appears to be that while applicants' quaternary ammonium halides contain two secondary alkyl groups, the need for the inventive process in retrospect would not have been obvious.

In conclusion, the subject inventive process lends itself to certain changes, substitutions and modifications without varying from the inventive process. For example, process temperatures and the alkanols employed can be varied to some extent without deleterious results. However, the metes and bounds of the invention are best determined by a reading of the claims taken in conjunction with the specification.

What is claimed is:

1. A process for separating the purifying dialkyl dimethylammonium halides, each of said alkyl groups having about 10 to 24 carbon atoms, from amine hydrohalide-type contaminants, said products and said contaminants being present in the form of substantially anhydrous mixtures, comprising the steps of:
   a. contacting said mixture with at least a solubilizing amount of lower alkanols containing less than 5% of water until both ammonium halide and amine hydrohalide-type contaminants are solubilized to produce a one-phase solution,
   b. treating said solution with gaseous ammonia until substantially all of said contaminant is precipitated, and
   c. separating the solubilized product contained therein.

2. The process of claim 1 wherein the halide in the product and contaminant is a chloride.

3. The process of claim 1 wherein the halide in the produce and contaminant is bromide.

4. The process of claim 2 wherein the alkanol solvent is isopropanol.

5. The process of claim 4 wherein the dialkyldimethylammonium chloride products are in the form of a mixture.

6. A process for separating the purifying dialkyldimethylammonium chloride products which contain two methyl groups and two secondary alkyl groups, each of said alkyl groups having about 10 to 14 carbon atoms, from amine hydrohalide-type contaminants produced from clarified, dehydrated reaction mixtures derived from the base catalyzed methylation of di-($C_{10}$–$C_{14}$)-secondaryalkyl amines with excess methyl chloride over what is required by stoichiometry for the dimethylation of said di-($C_{10}$–$C_{14}$)-secondaryalkyl amine, comprising the steps of:
   a. contacting said clarified and dehydrated reaction mixture with the least amount of lower alkanols containing 1 to 4 carbon atoms at room temperature, until a solubilized one-phase solution containing quaternary ammonium chloride and amine hydrochloride-type contaminants is obtained,
   b. treating said one-phase solution with an excess of gaseous ammonia at room temperature until substantial precipitation takes place, c. separating the precipitate from the one-phase system, and d. isolating said dialkyldimethylammonium products contained therein.

7. A process for separating the purifying dialkyl dimethylammonium chlorides, each of said alkyl groups having about 10 to 24 carbon atoms, from amine hydrochloride contaminants, said products and said contaminants being present in the form of clarified, dehydrated mixtures obtained through the base catalyzed methylation of the dialkyl dimethylammonium chloride, the process consisting essentially of:

a. contacting said mixture with from 6 to 7 moles of isopropanol containing less than 5% by weight of water until the dialkyldimethyl chloride and amine hydrochloride contaminants are solubilized to produce a one-phase solution, b. treating said one-phase solution with from 0.5 to 0.7 moles of gaseous ammonia per mole of amine hydrochloride until substantially all of said contaminant is precipitated as ammonium halide.

c. separating the solubilized product contained therein, d. stripping off the isopropanol under vacuum, e. mixing the remaining residue with sufficient water until a two-phase system consisting of an aqueous and organic phase is produced.

f. separating the organic phase, and g. stripping the aqueous phase under vacuum to yield a purified quaternary ammonium chloride substantially free from amine hydrohalide impurities.

* * * * *